United States Patent
Ichida et al.

(10) Patent No.: US 8,864,168 B2
(45) Date of Patent: Oct. 21, 2014

(54) PASSENGER PROTECTION APPARATUS

(71) Applicants: Atsushi Ichida, Tokyo (JP); Norio Yamataki, Tokyo (JP); Hiroaki Isozaki, Tokyo (JP)

(72) Inventors: Atsushi Ichida, Tokyo (JP); Norio Yamataki, Tokyo (JP); Hiroaki Isozaki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/900,966

(22) Filed: May 23, 2013

(65) Prior Publication Data
US 2013/0313811 A1 Nov. 28, 2013

(30) Foreign Application Priority Data
May 25, 2012 (JP) ................. 2012-120279

(51) Int. Cl.
*B60R 21/18* (2006.01)
*B60R 21/233* (2006.01)
*B60R 21/2338* (2011.01)

(52) U.S. Cl.
CPC .............. *B60R 21/18* (2013.01); *B60R 21/233* (2013.01); *B60R 2021/23382* (2013.01); *B60R 2021/23308* (2013.01); *B60R 2021/23316* (2013.01); *B60R 2021/23324* (2013.01)
USPC ....................................... 280/733; 280/743.1

(58) Field of Classification Search
CPC B60R 21/18; B60R 21/233; B60R 2021/233; B60R 2021/23308; B60R 2021/23316; B60R 2021/23324; B60R 2021/23382; B60R 2021/2338
USPC ................... 280/733, 743.1, 743.2, 751, 808
See application file for complete search history.

(56) References Cited

U.S. PATENT DOCUMENTS 5,282,648 A * 2/1994 Peterson ........................ 280/733
7,434,833 B2 * 10/2008 Kore ............................ 280/733

(Continued)

FOREIGN PATENT DOCUMENTS

EP  1157900 A2 * 11/2001 ............. B60R 21/16
JP  63258239 A * 10/1988 ............. B60R 21/18

(Continued)

OTHER PUBLICATIONS

Website for Takata Corporation "Vehicular Safety System Maker Takata Corporation Exhibits Airbelt at Good Design Exposition (EXPO) 2011" http://www.takata.com/pdf/110824_JP.pdf, Aug. 24, 2011, accessed May 20, 2012, (2 pages).
Extended European Search Report and European Search Opinion issued in counterpart European Application No. 13 16 8876.4, dated Aug. 16, 2013 (7 pages).

*Primary Examiner* — Keith Frisby
(74) *Attorney, Agent, or Firm* — Fitch, Even, Tabin & Flannery, LLP (57) ABSTRACT

A seat belt is wound up in a passenger protection apparatus. An airbag to be inflatable is at a position of a shoulder belt of the seat belt by being folded like a belt in the passenger protection apparatus. The passenger protection apparatus includes a fabric member which configures a bag-like member of the airbag and a partition wall fabric. The partition wall fabric has portions respectively connected to first and second parts of the fabric member and partitions an inside of the bag-like member into a central inflatable portion and supporting inflatable portions each of which is located between a passenger-side surface of the fabric member and a fabric formed of the central inflatable portion. The first and second parts configure inner surface of the bag-like member and hold the seat belt. The second part is configured to face a passenger and opposite to the first part.

5 Claims, 11 Drawing Sheets

(56) References Cited

U.S. PATENT DOCUMENTS

| | | | |
|---|---|---|---|
| 7,571,931 B2 * | 8/2009 | Watanabe | 280/733 |
| 2007/0096535 A1 * | 5/2007 | Lundell et al. | 297/470 |
| 2011/0006507 A1 * | 1/2011 | Fukawatase et al. | 280/733 |
| 2012/0193957 A1 * | 8/2012 | Grover | 297/219.1 |
| 2012/0306185 A1 * | 12/2012 | Kim et al. | 280/733 |

FOREIGN PATENT DOCUMENTS

| | | |
|---|---|---|
| JP | 2001-260807 A | 9/2001 |
| JP | 2010-036836 A | 2/2010 |

* cited by examiner

Related Art

FIG.10C

Related Art

FIG.11A Related Art

FIG.11B Related Art

PASSENGER PROTECTION APPARATUS

CROSS-REFERENCE TO RELATED APPLICATION

This application is based on and claims priority under 35 U.S.C. §119 from Japanese Patent Application No. 2012-120279 filed on May 25, 2012, the entire content of which is hereby incorporated herein by reference in its entirety.

BACKGROUND

1. Technical Field

The present invention generally relates to a passenger protection apparatus and, more particularly, to a passenger protection apparatus configured such that the sufficient tensile force of a seat belt is ensured in an initial inflation stage of an airbag folded like a belt and provided at the position of a shoulder belt when the airbag is inflated upon the detection of a vehicular collision to extend from the chest part to a shoulder part of the passenger, and that subsequent deformation of the airbag enables the passenger protection apparatus to effectively restrain the passenger.

2. Related Art

The assignee of the present application developed a passenger protection apparatus (hereinafter referred to as an airbelt apparatus) configured such that an airbag housed in a shoulder belt of a seat belt is inflated around a portion extending from the chest part to a shoulder upper part of a passenger and that a single manufactured airbelt apparatus can deal with two accident modes, i.e., a frontal collision and a lateral collision (see Takata Corporation, "Vehicular Safety System Maker Takata Corporation Exhibits Airbelt at Good Design Exposition (EXPO) 2011", [online], Aug. 24, 2011 [retrieved on May 20, 2012], Internet, <http:www.takata.com/pdf/110824_JP.pdf>).

This airbelt apparatus is such that the airbag is inflated along the shoulder belt worn by the passenger so as to have a substantially spindle shape thereby to increase the contact area between the airbag and the chest part of the passenger and to disperse and alleviate impact to be imposed on the chest part.

However, this airbelt apparatus is provided with two retractors that respectively wind a lap-belt-side part of the seat belt with respect to a tongue fixed to the seat belt and a shoulder-belt-side part of the seat belt, which houses the airbag as an airbelt, with respect to the tongue. Consequently, cost is high. Thus, this airbelt apparatus is assumed to be mounted in a luxury car or the like.

On the other hand, the assignee advances the development of another airbelt apparatus configured such that a shoulder belt into which an airbelt is incorporated and a lap belt provided opposite to the shoulder belt with respect to a tongue plate can be drawn from and wound into a single retractor. However, in the case of using the single retractor, it is necessary to configure the airbelt apparatus such that when a piece of webbing is drawn out of the retractor, an airbelt part (i.e., a part of the shoulder belt) having a tongue provided with a tongue plate and a gas supply port at an end portion thereof can smoothly slide against the webbing to an appropriate position between the chest part and the shoulder part, in addition to the drawing of a predetermined amount of the lap belt.

JP-A-2001-260807 discloses an airbelt apparatus configured to solve the above problem and to enable that webbing is surely wound using only a single retractor. The airbelt apparatus disclosed in JP-A-2001-260807 is such that a bag assembly 7 formed substantially-flat accommodates, in a cover formed with warp-knitted knit-fabric, the webbing 4 and an airbag in which a gas passage 22a and four elongated gas chambers 22b are formed in parallel.

SUMMARY OF THE INVENTION

A seat belt is wound up by a single winding device in a passenger protection apparatus. An airbag configured to be inflatable in response to a predetermined actuating signal is provided at a position of a shoulder belt of the seat belt by being folded like a belt in the passenger protection apparatus. The passenger protection apparatus includes a fabric member and a partition wall fabric. The fabric member configures a bag-like member of the airbag. The partition wall fabric has portions respectively connected to a first part and a second part of the fabric member and partitions an inside of the bag-like member into a central inflatable portion and supporting inflatable portions each of which is located between a passenger-side surface of the fabric member and a fabric formed of the central inflatable portion. The first and second parts configure an inner surface of the bag-like member. The first and second parts hold the seat belt. The second part is configured to face a passenger and configured to be opposite to the first part.

In the passenger protection apparatus, when the airbag is inflated between the seat belt and the passenger so as to restrain the passenger, the central inflatable portion is inflated to be supported by the supporting inflatable portions, so that a tensile force of the seat belt is maintained. The supporting inflatable portions are then deformed substantially flat so as to restrain the passenger.

In the passenger protection apparatus, both ends of the partition wall fabric are sewed to the first part of the fabric member in a direction along the seat belt. A central part between the both ends of the partition wall fabric is sewed to the second part of the fabric member, so that the inside of the bag-like member is partitioned into the central inflatable portion and the supporting inflatable portions.

In the passenger protection apparatus, the partition wall fabric and a fabric member that configures an insertion passage through which the seat belt passes are integrally sewed to the first part.

In the passenger protection apparatus, a part of the partition wall fabric, which is partitioned into the central inflatable portion and the supporting inflatable portions, is formed between two slits which allows the airbag to slide on the seat belt by passing through the two slits.

BRIEF DESCRIPTION OF THE DRAWINGS

FIGS. 8A to 8D are plan views and a cross-sectional view illustrating an example of seams of the airbag, and so on.

DETAILED DESCRIPTION

Hereinafter, the following several embodiments are described with reference to the accompanying drawings as modes for carrying out a passenger protection apparatus according to the invention.

Figure 1:
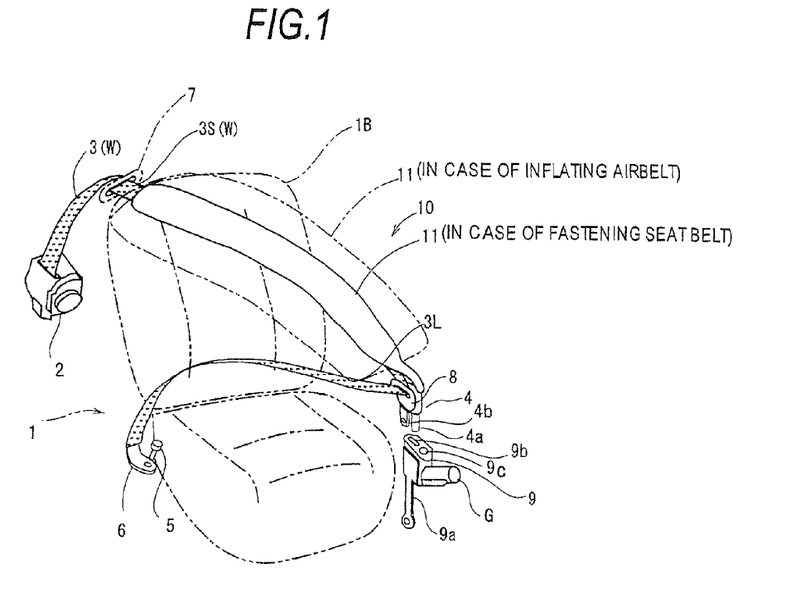
FIG. 1 is a perspective view illustrating a configuration of in-vehicle equipment into which a passenger protection apparatus according to the invention is incorporated.

FIG. 1 is a perspective explanatory view schematically illustrating a state in which a passenger protection apparatus 10 according to the invention (also referred to as an airbelt apparatus 10, hereinafter) is equipped on a passenger seat 1. FIG. 1 illustrates a state in which a seat belt 3 drawn out of a retractor 2 is folded back at a tongue 4 and in which an end portion of the seat belt 3 is fixed to an anchor plate 6. The anchor plate 6 is fixed to a stationary part (not shown) of a vehicle body (not shown). In the following description, the expression "seat belt" is used as a term used in the case of restraining a passenger, performing the functions of the seat belt, and indicating a part, e.g., a shoulder belt. A woven fabric belt member which is wound up by and drawn out from the retractor by a predetermined drawing force is hereinafter referred to as "webbing".

The retractor 2 illustrated in FIG. 1 is designed to be housed in and fixed to a vehicle-body-side part, e.g., a B-pillar, a C-pillar, and a tray in rear of a rear seat, or a part of a seat in a seat back 1B, corresponding to a seat on which the retractor 2 is equipped. The webbing W is in a state in which the webbing W is wound up by the retractor 2 by maintaining a predetermined tensile force at the side of the seat just after a passenger is seated. The webbing W is parted into a shoulder belt 3S and a lap belt 3L at the position of the tongue 4. A part of the webbing W, which serves as the lap belt 3L, is wound up by the retractor 2 except when the lap belt 3L is used. When a passenger is seated, the part of the webbing W, which serves as the lap belt 3L, is ensured by drawing the webbing W out of the retractor 2 and pulling the tongue 4 to a buckle 9, as illustrated in FIG. 1. At that time, while the passenger is seated, the passenger grabs the webbing W placed beside the passenger, and draws the webbing W out of the retractor 2. This position of the tongue 4 corresponds to an end of an airbelt 11 accommodating a folded airbag 20. The airbag 20 configuring the airbelt 11 ensures a sufficient space between the passenger and the webbing W when the airbag 20 is initially inflated. Thus, a sufficient initial tensile force of the seat belt can be maintained. Then, the airbelt 11 is deformed so as to effectively protect the passenger. Consequently, the apparatus 10 can perform an effective impact absorption action on the passenger. This is a technical characteristic of the invention. This is one of technical characteristics of the invention. The detailed description of the apparatus 10 according to the invention is described below with reference to FIGS. 3A to 3C and 4A to 4C.

Figure 2:
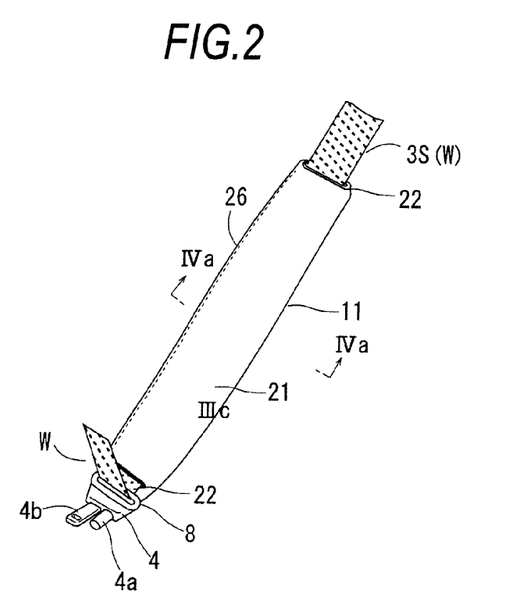
FIG. 2 is a schematic perspective view illustrating an airbelt apparatus serving as the passenger protection apparatus illustrated in FIG. 1.

Another configuration of the airbelt 10 disclosed in FIG. 1 is supplementarily described hereinafter. A shoulder anchor 7 is installed at the top of the right-shoulder-side part of the seat back 1B. Usually, the shoulder anchor 7 is provided at an upper part of the B-pillar or the top of the seat back 1B. The shoulder belt 3S is led to the retractor 2 by being turned around at the shoulder anchor 7. On the other hand, as illustrated in FIG. 2 by extracting the airbelt 11 and so on, the airbelt 11, whose configuration is described in detail below, is attached to the part of the webbing W, which serves as the shoulder belt 3S. As illustrated in FIGS. 1 and 2, at an end of the airbelt 11 according to the invention, the tongue 4 is shaped integrally with a through anchor 8. A gas supply pipe 4a is provided in juxtaposition with a tongue plate 4b. The gas supply pipe 4a is a metallic tubular member. A gas supply path (not shown) provided in the tongue 4 to communicate with the gas supply pipe 4a is airtightly connected to a gas introducing port 20a of the airbag 20 illustrated in FIG. 3.

FIG. 1 also illustrates a buckle 9 holding the gas supply pipe 4a and the tongue plate 4b of the tongue 4. The buckle 9 is fixed via a bracket 9a through a fixing member, such as bolts, to a stationary part (not shown) of a vehicle body, which is provided beside the seat. A tongue plate supporting hole 9b and a gas supply pipe connecting hole 9c are formed in the buckle 9. When the tongue 4 is attached thereto, the tongue plate 4b and the gas supply pipe 4a are simultaneously inserted into the holes 9b and 9c of the buckle 9, respectively. In addition, a gas exhaust nozzle (not shown) of the inflator G externally attached to the buckle 9 is made to communicate with the connecting hole 9c into which the gas supply pipe 4a is inserted. Accordingly, when an actuating signal is sent to the inflator G at collision or the like, gas is spouted from the gas exhaust nozzle of the inflator G by igniting an igniting agent in the inflator G. The airbag 20 (see FIG. 3) is inflated along the shoulder belt 3S worn by the passenger so as to have a cross-sectional shape partitioned by partition-walls 41 into plural partitions respectively having predetermined cross-sectional shapes (see FIG. 4B). Then, with increase of the tensional force of the belt due to the forward movement of the passenger, inflatable portions respectively corresponding to the plural partitions are deformed into a substantially flat thickness surface shape (see FIG. 4C). Consequently, in the initial inflation stage of the airbelt 11, the sufficient initial tensional force of the webbing W can be ensured. Thus, a passenger restraining effect can be enhanced. In addition, due to the subsequent deformation of the entire airbag 20, the passenger's lateroabdominal part, chest part, and shoulder upper part can gently be restrained (see FIGS. 4C, 5B, and 1 (the shape of the inflated airbelt is indicated by imaginary lines in FIG. 1)).

Figures 3A, 3B, 3C:
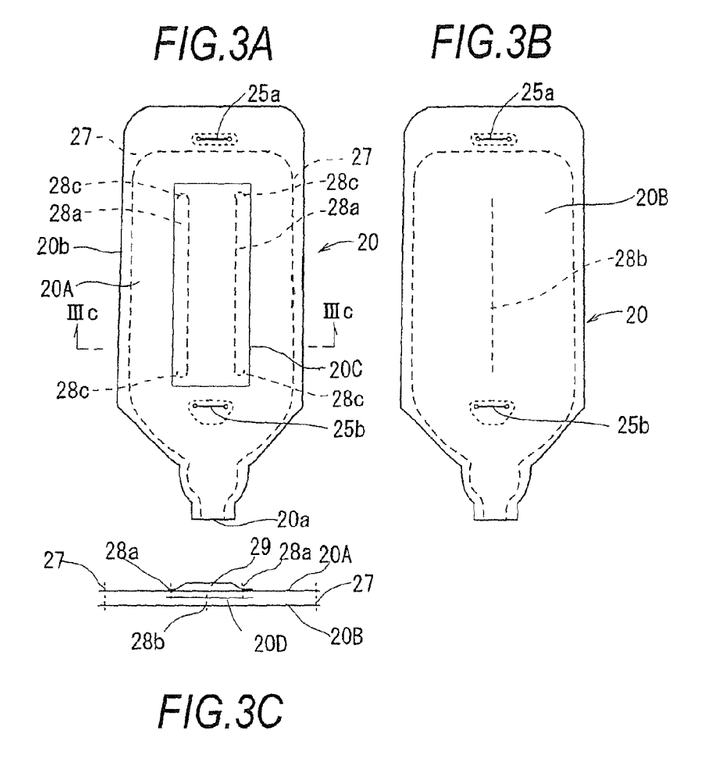
FIGS. 3A to 3C are plan views and a cross-sectional view illustrating the airbag illustrated in FIG. 2, which is in a state before folded.
Figures 4A, 4B:
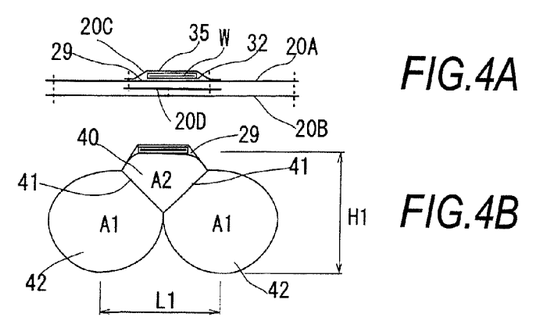
FIG. 4A to 4C are cross-sectional views illustrating the airbag illustrated in FIG. 3C, which is in a state when inflated.

Hereinafter, the configuration of the airbelt 11 slidably attached to a part of the webbing W, which corresponds to the shoulder belt 3S, is described with reference to FIGS. 2, 3A to 3C, and 4A to 4C. FIG. 2 is an external view illustrating the airbelt 11 fit onto the part of the webbing W, which corresponds to the shoulder belt 3S. The airbelt 11 illustrated in FIG. 2 is configured such that the full-width airbag 20 illustrated in FIG. 4A is folded to have an elongated shape whose width is substantially adjusted to the width of the webbing W, using the webbing W placed in the airbelt 11 as a core member, and then covered with an exterior cover 21. The exterior cover 21 is made by sewing a fabric like a cylinder. When the airbelt 11 operates, a sewing thread 26 arranged to extend in a longitudinal direction and adapted to easily be broken, is broken, so that the inflated airbag 20 is exposed.

Opening guide rings 22 made of polyurethane resin are attached to opening portions provided at both ends of the exterior cover 21. The opening guide rings 22 are high in stiffness. Therefore, the opening guide rings 22 are difficult to deform. Due to the substantially flat shape of the openings, the webbing W can be maintained in a substantially flat state. In addition, the sliding resistance between the webbing W and the airbelt 11 is reduced. Consequently, when the seat belt is fastened, the airbelt 11 can smoothly slide along the webbing W.

The configuration of the airbag 20 which is a main component of the airbelt 11 and mounted on the webbing W is described hereinafter with reference to FIGS. 3A to 3C. FIG. 3A is a plan view illustrating a state of the top surface (corresponding to a vehicle-interior side which is a first part side) of the airbag 20 before folded. FIG. 3B is a plan view illustrating a state of the bottom surface (corresponding to a passenger side which is a second part side) of the airbag 20 before folded. FIG. 3C is a cross-sectional view illustrating the fabrics with lines. The airbag 20 is a fabric member formed by sewing base fabrics, each of which is cut out into an elongated shape of a predetermined dimension, like a predetermined bag provided with a gas supply port 20a at one end thereof, utilizing an outer peripheral seam 27 which forms an outer peripheral shape of the airbag slightly inside of an outer peripheral edge 20b. In addition, slits 25a and 25b are formed at the nearly center in a width direction of the airbag 20 and at locations sufficiently away from each other along the longitudinal direction. One 25b of the slits is formed in an inflatable region of the airbag 20. Thus, a region for preventing leakage of air is formed around the slit 25b.

In addition, as illustrated in FIGS. 3A to 3C, between two fabric members (i.e., a front surface fabric 20A corresponding to a vehicle-interior-side surface which is a first part surface, and a back surface fabric 20B corresponding to a passenger-side surface which is a second part surface) configuring the outer surface of the airbag 20, the front surface fabric 20A has one side surface (i.e., an outer surface in this embodiment) to which a passage formation fabric piece 20C is sewed using two seams 28a extending in the longitudinal direction. A space 29 between the passage formation fabric piece 20C and the front surface fabric 20A serves as an insertion passage (hereinafter also designated with reference numeral 29) through which the webbing W is inserted.

In addition, as illustrated in FIGS. 3A to 3C, a partition wall fabric piece 20D is sewed to the front surface fabric 20A and the back surface fabric 20B so as to be put therebetween. The partition wall fabric piece 20D is configured by a fabric which has substantially the same shape as the shape of the passage formation fabric piece 20C and is made of the same material. The partition wall fabric piece 20D is sewed to the inner surface of the front surface fabric piece 20A at both ends thereof. A central portion of the partition wall fabric piece 20D is sewed to the back surface fabric 20B (see FIG. 3B). Incidentally, in order to prevent leakage of air from each of the seams 27, 28a, and 28b, airtightness may be enhanced by sewing and bonding the fabric pieces together.

Figure 4C:
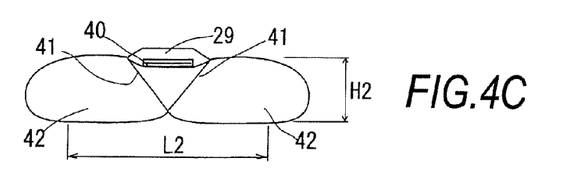

Hereinafter, the configuration and the functions of the partition wall fabric piece 20D serving as one of technical characteristics of the invention are described with reference to FIGS. 4A to 4C, 6, and 7A and 7B. FIG. 4A illustrates a state in which the webbing W is inserted into a webbing insertion passageway (hereinafter also designated with reference numeral 29) configured by the insertion passage 29 illustrated in FIG. 3C, a gate-shaped guide 35, and a flexible sheet 32 (described below), so that the webbing W is mounted in the apparatus. When gas is supplied into the airbag 20 by causing, at collision or the like, the inflator G to operate in this state, the airbag 20 supports the webbing insertion passageway 29 by the top side-surface portion thereof, as illustrated in FIG. 4B, in an initial stage (i.e., within an elapsed time range of 0 to 20 milli-seconds (msec)). In addition, the airbag 20 is inflated so as to have a cross-sectional shape including a cross-sectionally substantially-isosceles-triangular shaped central inflatable portion 40 whose two surfaces function as partition walls 41, and two supporting inflatable portions 42 each of which is partitioned from the central inflatable portion 40 by an associated one of the partition walls 41 respectively corresponding to the cross-sectionally equilateral sides. According to this embodiment, the ratio of the cross-sectional area of the central inflatable portion 40 to the cross-sectional area of each of the supporting inflatable portion 42 is set at about 60%. In this state, as illustrated in FIG. 4B, the central inflatable portion 40 is supported on the supporting inflatable portions 42. About 90 millimeters (mm) is ensured as the distance H1 from the passenger-side surface (i.e., the bottom-surface-side surface) to the webbing W in the webbing insertion passageway 29. After the airbag 20 is inflated, each of the supporting inflatable portions 42 of the airbag 20, which are contacted with the passenger, is deformed into a substantially flat shape substantially without changing the volume thereof, as illustrated in FIG. 4C, due to, e.g., the retraction of the webbing W and the forward lean of the passenger. Accordingly, the height H2 from the passenger-side surface to the webbing W is reduced to about 60% of the height H1 illustrated in FIG. 4B. The width of a part of the inflatable portions 42, which is contacted with the passenger, is increased from L1 (e.g., 80 mm) in the state illustrated in FIG. 4B to L2 (e.g., about 1.75 times to 2.0 times the width L1) in the state illustrated in FIG. 4C.

[Confirmation Test for Effects of Restraining Passenger]

Figure 5A:
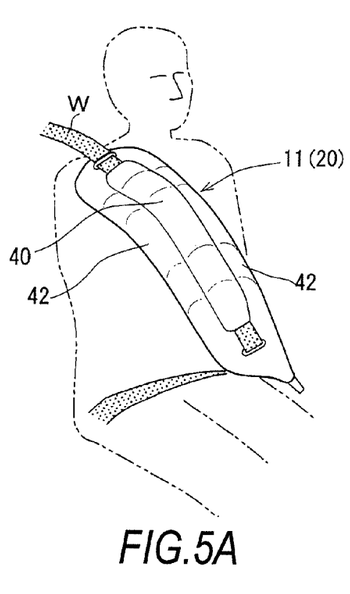
FIGS. 5A and 5B are schematic perspective views illustrating a schematic shape of the airbelt apparatus illustrated in FIG. 1, which is in a state before inflated.
Figure 5B:
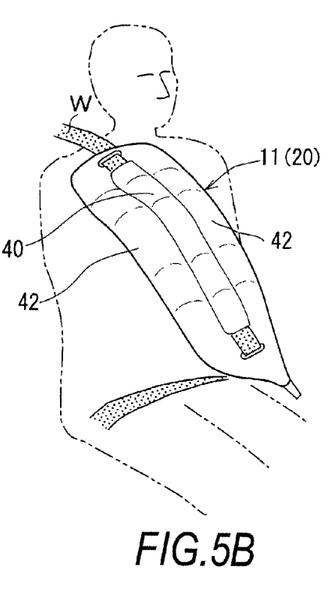
Figures 10A, 10B:
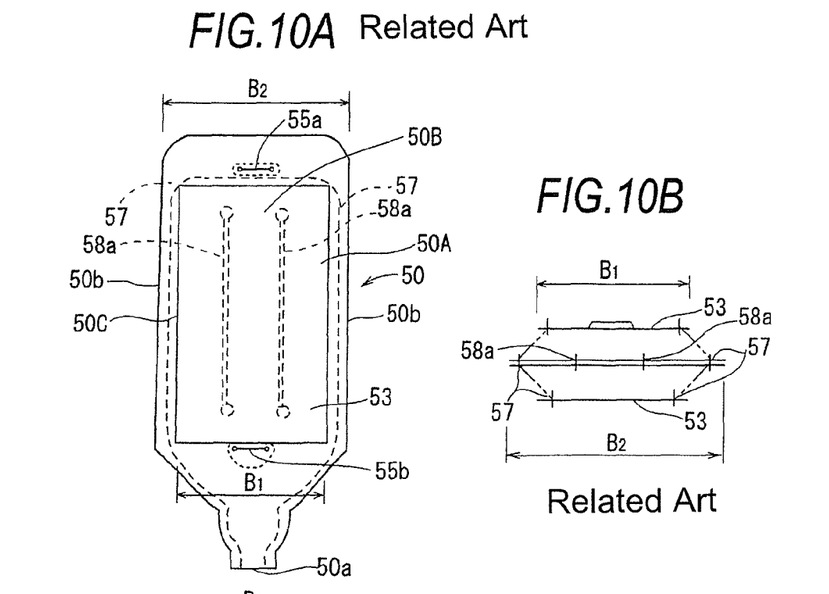
FIGS. 10A to 10C are respectively a plan view and cross-sectional views illustrating an example of an airbelt apparatus which the assignee of the present application has already proposed.
Figure 10C:
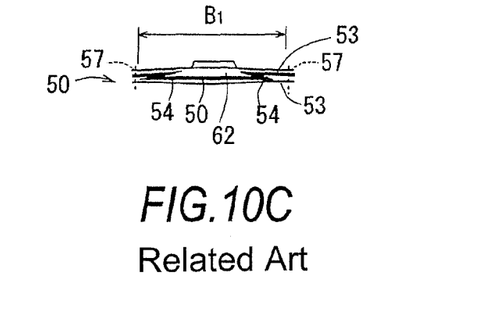

FIGS. 5A and 5B are schematic perspective views each illustrating a state in which the effects of restraining a passenger by the airbelt illustrated in FIG. 2 are confirmed by conducting a test using a dummy-passenger. FIG. 5A illustrates a state in the case of restraining and protecting a dummy-passenger using the airbelt 11 configured by the airbag 20 having a cross-sectional shape illustrated in FIG. 4B. FIG. 5B illustrates a state in the case of restraining and protecting a dummy-passenger using the airbelt 11 configured by the airbag 20 having a cross-sectional shape illustrated in FIG. 4C. In an initial stage of inflation of the airbag 20 of the airbelt 11, as illustrated in FIG. 5A, the central inflatable portion 40 supporting the webbing W is supported by the supporting inflatable portions 42 and held at a position away from the dummy-passenger. Thus, the tensile force initially introduced to the webbing W was maintained at a high level even in the initial stage, as compared with the tensile force in the case of the airbelt apparatus illustrated in FIG. 10A to 10C. It was found that since then, the tensile force initially introduced to the webbing W was maintained to be relatively high, as compared with the tensile force in the case of the airbelt apparatus illustrated in FIG. 10A to 10C.

Figure 6:
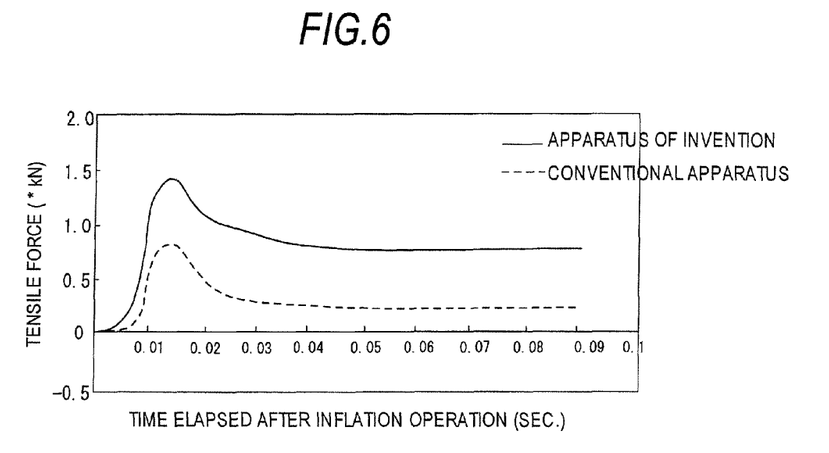
FIG. 6 is a graph illustrating temporal change of the tensile force of a seat belt while the airbag is inflated.
Figure 11A:
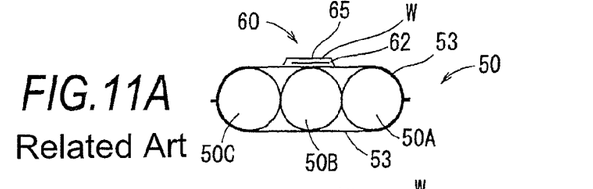
FIGS. 11A and 11B are cross-sectional views illustrating the inflation behavior of the airbelt apparatus illustrated in FIGS. 10A to 10C.
Figure 11B:
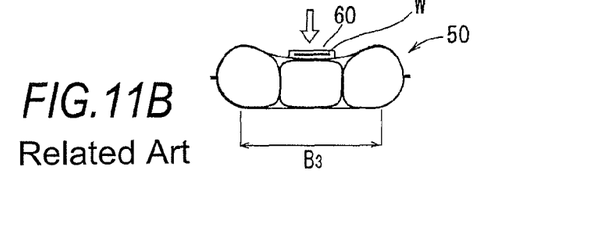

FIG. 6 is a graph illustrating temporal change of the tensile force of the webbing, which was found for a period of time elapsed since the inflator was operated (i.e., an elapsed time of inflation of the airbag), at the test using the dummy-passenger. As illustrated in FIG. 6, it could be confirmed that the airbelt apparatus according to the invention could maintain the tensile force of the webbing W to be about twice the tensile force in the case of the conventional airbelt apparatus having three cylindrical partitions (incidentally, FIGS. 11A and 11B illustrate cross-sectional shapes of the airbelt apparatus cited as a conventional product), and that effects of highly restraining the dummy-passenger could be obtained.

Figure 7A:
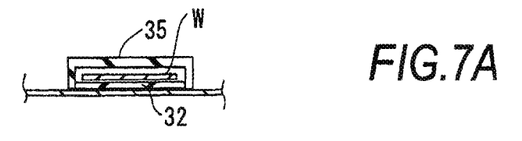
FIGS. 7A and 7B are a cross-sectional view and a side view illustrating a slide guide, respectively.
Figure 7B:
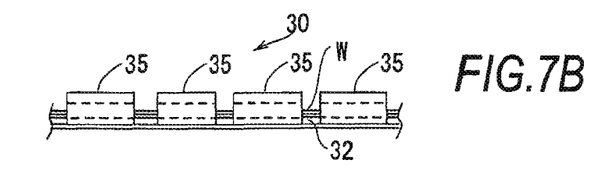

Incidentally, in order to enable the above airbelt 11 and the webbing W of the seat belt apparatus to operate independent of each other, according to the invention, a row of a large number of gate-shaped guides 35 serving as high-stiffness parts illustrated in FIG. 7A is provided in a length direction of the flexible sheets 32 serving as low-stiffness parts so that the webbing W smoothly moves, similarly to the apparatus disclosed by the above application. According to this embodiment, the gate-shaped guide 35 is shaped like a substantially flat inverted-U whose inner dimension of is slightly larger than the width of the webbing W and whose dimension in a length direction is about 1.5 centimeters (cm). The gate-shaped guide 35 is welded to the flexible sheet 32 at the bottom thereof. The gate-shaped guide 35 has high stiffness in the width direction of the webbing W. The distance between the gate-shaped guides 35 adjoining in the longitudinal direction of the webbing W is set to be equal to or less than 1 cm, as illustrated in FIG. 7B. Thus, a row of a large number of gate-shaped guides 30 is provided in the length direction of the flexible sheet 32 serving a low-stiffness part. According to this embodiment, a polyurethane resin is used as the resin material configuring the guides. In addition, thermoplastic elastomers (e.g., ester-based ones, and olefin-based ones), polyamide resins, rigid polyurethane resins, polyester resins, metal plates and the like can be used as appropriate materials of the guide.

According to this embodiment, the flexible sheet 32 is an elongated flexible plate-like member which is substantially equal in width to the webbing W. The flexible sheet 32 fixed to a range in a longitudinal direction of the webbing insertion passageway 29 illustrated in FIG. 3A by bonding or sewing. The surface of the flexible sheet 32 is smoothly finished. Thus, when the webbing W moves in the longitudinal direction, the sliding resistance between the flexible sheet 32 and the webbing W is suppressed to a minimum level. According to the present embodiment, thermoplastic elastomers (e.g., ester-based ones and olefin-based ones) are used as the resin material configuring the flexible sheet 32. In addition, flexible polyurethane resins, silicon elastomers, rubber materials (e.g., synthetic ones, and natural ones), and the like can be used as the appropriate materials of the flexible sheet 32. Incidentally, the functions of the slide guide 30 can be fulfilled by using the same material as the materials of the above gate-shaped guide 35 and the above flexible sheet 32 and designing the gate-shaped guide 35 and the flexible sheet 32 so as to differ in shape (e.g., thickness, and width) to thereby bring out the difference in stiffness.

[Shape of Each End Portion of Seam]

Figure 8A:
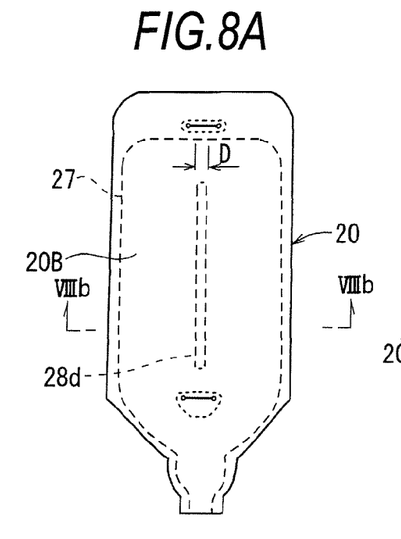
Figures 8B, 8C:
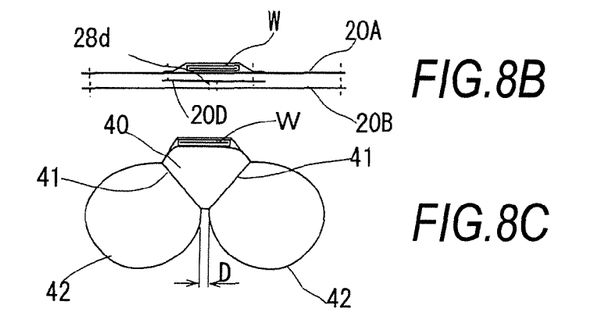
Figure 8D:
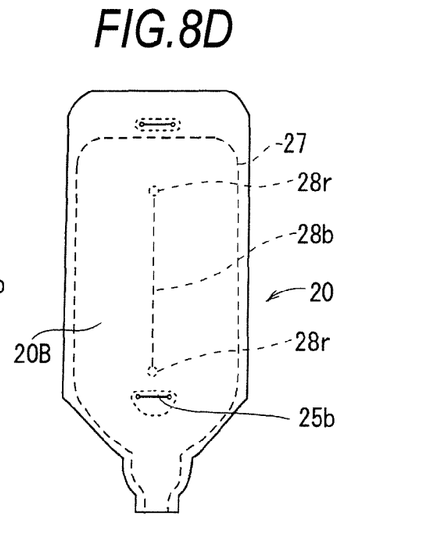

According to some design, the back surface fabric 20B and the partition wall fabric piece 20D of the airbag 20 can be sewed using a single linear seam 28$b$, as illustrated in FIG. 3B. However, when the airbag 20 is actually inflated, the inflation of the airbag 20 is suppressed at the position of the seam, whereas a part surrounding each end portion of the seam is rapidly inflated. Accordingly, stress concentration occurs at the end portions of the seam. Thus, this problem can be eliminated by forming a semicircular seam 28$c$ so as to be continuous to each end portion of the seam, as illustrated in FIG. 3A. FIGS. 8A and 8D illustrate other examples of the shape of each seam. FIG. 8A illustrates an example of first providing two seams so as to be separated from each other at a distance of about 10 mm, and then forming a semicircular seam 28$c$ to continuously connect end portions at each of both sides in the longitudinal direction of the two seams. Because the two linear seams are first arranged in parallel, the airbag 20 is shaped in the initial inflation stage such that the supporting inflatable portions 42 each partitioned from the central inflatable portion 40 are separated from each other at a width D, as illustrated in FIG. 8C. However, the webbing W is held at a position sufficiently separated from a passenger. Preferably, as illustrated in FIG. 8D, a ring-like seam 28$r$ serving as a stress relaxation portion is provided at each end portion of the single linear seam 28$b$.

Figure 9A:
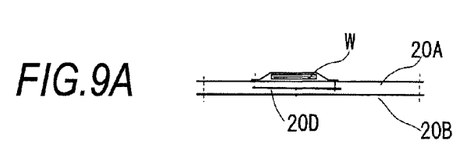
FIGS. 9A to 9C are cross-sectional views illustrating an initial state, an initial inflated state, and a more inflated state of an example of a central inflatable portion of an airbag, respectively.
Figure 9B:
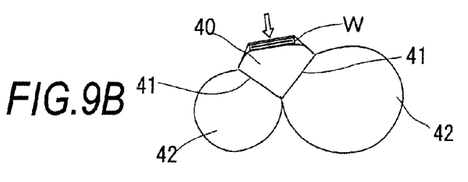
Figure 9C:
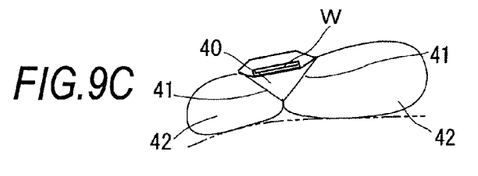

FIGS. 9A to 9F illustrate other examples of the dimensions and the attachment position of the partition wall fabric piece 20D. The airbag 20 of the airbelt 11 according to the invention is set such that the partition wall fabric piece 20D is arranged at the central position in the width direction of the airbag 20, and that the cross-sectional shape of the airbag 20 in the inflation stage is symmetric with respect to the width direction. However, passengers have various body shapes. Preferably, when the webbing W is made to extend from above one of the shoulders of the passenger to a part close to a hipbone of the passenger at the opposite side, the airbag of the airbelt apparatus is inflated so as to be fit to the body shape, especially, the shape of the front surface of the body of the passenger. Therefore, as illustrated in, e.g., FIG. 9A, the webbing insertion passageway 29 and the partition wall fabric piece 20D are shifted from the center position in the width direction of the airbag 20 to make the capacities (thus, the cross-sectional areas) of the supporting inflation portions 42 differ from each other. Consequently, a position at which the seat belt restrains the passenger, and a direction in which the belt presses down the passenger can be controlled. In the first inflation stage, as illustrated in FIG. 9B, the airbag 20 is inflated in a state in which the supporting inflatable portions 42 provided on the left and right sides of the central inflatable portion 40 differing in cross-sectional area from each other. Thus, the direction in which the webbing W acts to restrain the passenger can be inclined according to the body shape of the passenger. Consequently, effects of restraining the passenger become more reliable. In addition, the tensile force of the webbing W is more increased due to the forward movement of the passenger. Thus, the airbag becomes substantially flat according to the shape of a part of the airbag 20, which is contacted with the passenger, becomes substantially flat (see FIG. 9C).

Figure 9D:
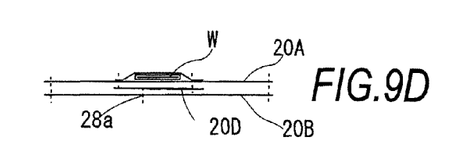
FIGS. 9D to 9F are cross-sectional views illustrating an initial state, an initial inflated state, and a more inflated state of another example of the central inflatable portion of the airbag, respectively.
Figure 9E:
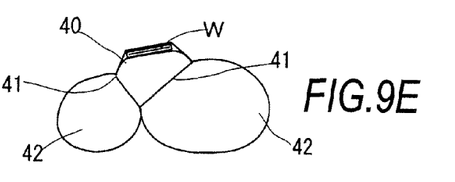
Figure 9F:
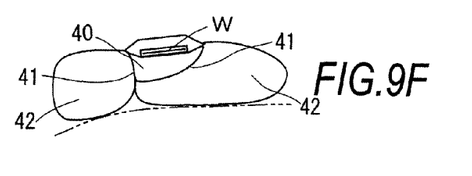

FIG. 9D illustrates an example of providing the airbag by shifting, from the center position in the width direction, the position at which the partition wall fabric piece 20D and the back surface fabric 20B of the airbag 20 are contacted with each other. In this case, a cross-sectional side length of the partition wall 41 between the central inflatable portion 40 and one of the supporting inflatable portions 42 differs from a cross-sectional side length of the partition wall 41 between the central inflatable portion 40 and the other supporting inflatable portion 42. Consequently, effects substantially equivalent to the effects obtained in the state illustrated in each of FIG. 9B and FIG. 9C can be obtained even in an associated one of the initial inflation stage illustrated in FIG. 9E and the state of the airbag 20 deformed by the tensile force of the webbing W, which is illustrated in FIG. 9F.

Incidentally, in the foregoing description, an example has been described, in which the material of the partition wall fabric piece 20D is the same as that of the base fabric of the airbag. However, the shape of the airbag can variously be controlled according to the partition wall fabric piece by diversely changing the material. Even in the case of configuring the airbag by making the material of the passenger-side surface to differ from the material of the webbing-side surface, obviously, the shape of the inflated airbag can be changed.

The present invention is not limited to the above embodiments, and can variously be modified within a range described in the appended-claims. That is, embodiments obtained by combining technical means appropriately changed within the range described in the appended-claims are also included in the technical scope of the invention.

What is claimed is:

1. A passenger protection apparatus in which a seat belt is wound up by a single winding device, and in which an airbag configured to be inflatable in response to a predetermined actuating signal is provided at a position of a shoulder belt of the seat belt by being folded like a belt, the passenger protection apparatus comprising:
    a fabric member that configures a bag-like member of the airbag; and
    a partition wall fabric that has portions respectively connected to a first part and a second part of the fabric member and that partitions an inside of the bag-like member into a central inflatable portion and supporting inflatable portions each of which is located between a passenger-side surface of the fabric member and a fabric formed of the central inflatable portion,
    wherein the first and second parts configure an inner surface of the bag-like member,
    the first and second parts hold the seat belt, and
    the second part is configured to face a passenger and configured to be opposite to the first part.

2. The passenger protection apparatus according to claim 1,
    wherein when the airbag is inflated between the seat belt and the passenger so as to restrain the passenger, the central inflatable portion is inflated to be supported by the supporting inflatable portions, so that a tensile force of the seat belt is maintained, and
    the supporting inflatable portions are then deformed substantially flat so as to restrain the passenger.

3. The passenger protection apparatus according to claim 1,
    wherein both ends of the partition wall fabric are sewed to the first part of the fabric member in a direction along the seat belt, and
    a central part between the both ends of the partition wall fabric is sewed to the second part of the fabric member, so that the inside of the bag-like member is partitioned into the central inflatable portion and the supporting inflatable portions.

4. The passenger protection apparatus according to claim 1,
    wherein the partition wall fabric and a fabric member that configures an insertion passage through which the seat belt passes are integrally sewed to the first part.

5. The passenger protection apparatus according to claim 1,
    wherein a part of the partition wall fabric, which is partitioned into the central inflatable portion and the supporting inflatable portions, is formed between two slits which allows the airbag to slide on the seat belt by passing through the two slits.

* * * * *